(12) United States Patent
Takahashi et al.

(10) Patent No.: US 10,482,322 B2
(45) Date of Patent: Nov. 19, 2019

(54) MONITOR APPARATUS FOR MONITORING SPATIAL REGION SET BY DIVIDING MONITOR REGION

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/958,133

(22) Filed: Apr. 20, 2018

(65) Prior Publication Data

US 2018/0336402 A1 Nov. 22, 2018

(30) Foreign Application Priority Data

May 17, 2017 (JP) ................................. 2017-097803

(51) Int. Cl.
*G06K 9/00* (2006.01)
*G06T 7/11* (2017.01)
*G07C 9/00* (2006.01)
*G08B 13/196* (2006.01)

(52) U.S. Cl.
CPC ..... *G06K 9/00369* (2013.01); *G06K 9/00268* (2013.01); *G06K 9/00342* (2013.01); *G06K 9/00771* (2013.01); *G06T 7/11* (2017.01); *G07C 9/00158* (2013.01); *G08B 13/196* (2013.01); *G06T 2207/30196* (2013.01); *G06T 2207/30232* (2013.01)

(58) Field of Classification Search
CPC ........... G05B 2219/40196; G05B 2219/40203; G06K 9/00268; G06K 9/00342; G06K 9/00369; G06K 9/00771; G06T 7/11; G06T 2207/30196; G06T 2207/30232; G07C 9/00158; G08B 13/196
See application file for complete search history.

(56) References Cited

U.S. PATENT DOCUMENTS

| 9,151,446 B2 * | 10/2015 | Doettling ................. F16P 3/14 |
| 2002/0186299 A1 | 12/2002 | Cofer |
| 2003/0076224 A1 * | 4/2003 | Braune ................... F16P 3/142 340/500 |

(Continued)

FOREIGN PATENT DOCUMENTS

| CN | 1591305 A | 3/2005 |
| CN | 101656023 A | 2/2010 |

(Continued)

*Primary Examiner* — Katrina R Fujita
(74) *Attorney, Agent, or Firm* — Hauptman Ham, LLP

(57) ABSTRACT

A monitor apparatus includes a camera that captures a three-dimensional image and an image processing device that processes the output signal of the camera. A part of an image capturing region of the camera is set as a monitor region. The image processing device includes a region setting unit that sets a plurality of spatial regions by dividing the monitor region. The region setting unit divides the monitor region at a plurality of cutting planes radially extending from the camera serving as a start point. The region setting unit sets the spatial region on one end as a precaution region and sets the spatial region on the other end as a limit region.

8 Claims, 13 Drawing Sheets

(56) References Cited

U.S. PATENT DOCUMENTS

| | | | |
|---|---|---|---|
| 2004/0227816 A1 | 11/2004 | Sato et al. | |
| 2004/0245435 A1* | 12/2004 | Komiya | H01L 27/14621 250/208.1 |
| 2004/0263476 A1 | 12/2004 | Lim et al. | |
| 2008/0240577 A1 | 10/2008 | Aartsen | |
| 2011/0001799 A1* | 1/2011 | Rothenberger | G06K 9/00771 348/47 |
| 2011/0001957 A1* | 1/2011 | Braune | G01B 11/00 356/4.01 |
| 2011/0264266 A1* | 10/2011 | Kock | B25J 9/1676 700/253 |
| 2012/0074296 A1 | 3/2012 | Hammes et al. | |
| 2013/0201292 A1* | 8/2013 | Walter | F16P 3/14 348/47 |
| 2014/0207285 A1* | 7/2014 | Sakabe | B25J 9/1697 700/259 |
| 2015/0217455 A1* | 8/2015 | Kikkeri | B25J 9/1676 700/259 |
| 2015/0287200 A1 | 10/2015 | Kokubun et al. | |
| 2015/0332463 A1 | 11/2015 | Galera et al. | |
| 2016/0104046 A1* | 4/2016 | Doettling | F16M 11/105 382/103 |
| 2017/0157783 A1* | 6/2017 | Ogawa | B25J 19/06 |
| 2017/0210017 A1* | 7/2017 | Yamamoto | B25J 19/06 |
| 2017/0320212 A1* | 11/2017 | Frisk | B25J 9/1676 |
| 2018/0043549 A1* | 2/2018 | Su | B25J 9/12 |
| 2018/0222052 A1* | 8/2018 | Vu | G01S 17/026 |

FOREIGN PATENT DOCUMENTS

| | | | |
|---|---|---|---|
| CN | 202662028 U | | 1/2013 |
| CN | 104335145 A | | 2/2015 |
| DE | 102010037744 B3 | | 12/2011 |
| DE | 102005063217 B4 | | 5/2014 |
| DE | 102013110321 A1 | | 7/2014 |
| JP | 5-261692 A | | 10/1993 |
| JP | 2003-143593 A | | 5/2003 |
| JP | 2003-162776 A | | 6/2003 |
| JP | 2004-530090 A | | 9/2004 |
| JP | 2004-276154 A | | 10/2004 |
| JP | 2005-339543 A | | 12/2005 |
| JP | 2008-33819 A | | 2/2008 |
| JP | 2009-521022 A | | 5/2009 |
| JP | 2010-208002 A | | 9/2010 |
| JP | 2010208002 A | * | 9/2010 |
| JP | 2013-10161 A | | 1/2013 |
| JP | 2013010161 A | * | 1/2013 |
| JP | 2014-140920 A | | 8/2014 |
| JP | 2015-75879 A | | 4/2015 |
| JP | 2015-201693 A | | 11/2015 |

* cited by examiner

MONITOR APPARATUS FOR MONITORING SPATIAL REGION SET BY DIVIDING MONITOR REGION

RELATED APPLICATIONS

The present application claims priority to Japanese Patent Application No. 2017-097803 filed on May 17, 2017, the disclosure of which is hereby incorporated by reference herein in its entirety.

BACKGROUND OF THE INVENTION

1. Field of the Invention

The present invention relates to a monitor apparatus that monitors spatial regions set by dividing a monitor region.

2. Description of the Related Art

In the related art, a monitor apparatus that captures an image with a camera and monitors a region in which the image is captured based on the captured image is known. The monitor apparatus can monitor an object in the range in which the image is captured by processing a captured image or comparing a plurality of images.

The monitor apparatus can be provided with a video camera or a two-dimensional camera. The monitor apparatus can detect the entry of a person into a predetermined region by processing the image that is captured by the camera (See, for example, Japanese Unexamined Patent Publication No. 2003-143593 and Japanese Unexamined Patent Publication No. 2015-75879). Alternatively, the monitor apparatus can monitor an operating state of a movable device such as a robot arm (See, for example, Japanese Unexamined Patent Publication No. 5-261692).

SUMMARY OF INVENTION

The monitor apparatus can detect the entry of the object into a predetermined region. For example, in a manufacturing factory, a region is set that allows the entry of an operator and a workspace is set for a manufacturing device so as to restrict the entry of the operator. The workspace is a region that is set so as to prevent the operator from touching the manufacturing device. The workspace is set around the manufacturing device such as a robot. The monitor apparatus can monitor the boundary between the workspace and the region that allows the entry of the operator.

A light curtain or a two-dimensional laser scanner can be used for detecting entry into the workspace. The light curtain or two-dimensional laser scanner can be disposed so as to monitor the boundary of the workspace.

The object to be transferred may pass through a region that is monitored by the monitor apparatus. For example, a machined workpiece may pass through the region that is monitored by the monitor apparatus. In this case, the monitor apparatus including the light curtain, etc. can have a muting function such that the workpiece properly passes through the region. The muting function is a function that stops the monitoring of the region through which the workpiece passes in a period during which the workpiece passes through the region. However, another device such as a photoelectric sensor for confirming the passage of the workpiece is required in order to perform the muting function.

When the muting function is performed, the region that is monitored by the light curtain or two-dimensional laser scanner is a part of the region that should be monitored. The operator may enter the workspace from the region other than the region that is monitored by the light curtain or two-dimensional laser scanner. This makes it difficult to determine a position for attaching the device such as the light curtain and two-dimensional laser scanner, or causes complicated control of the monitor apparatus.

A monitor apparatus according to an aspect of the present disclosure includes a three-dimensional camera that captures a three-dimensional image and an image processing device that processes an output signal of the three-dimensional camera. A part of an image capturing region of the three-dimensional camera is set as a monitor region for a monitoring operation. The image processing device includes a region setting unit that sets a plurality of spatial regions by dividing the monitor region. The region setting unit divides the monitor region at a plurality of cutting planes radially extending from the three-dimensional camera serving as a start point, sets the spatial region on one end of the monitor region in a predetermined direction as a first spatial region, and sets the spatial region on the other end of the monitor region in the predetermined direction as a second spatial region.

DETAILED DESCRIPTION

Referring to FIGS. 1 to 14, a monitor apparatus according to an embodiment will be described below. The monitor apparatus according to the present embodiment is disposed in a robot system that includes a robot for performing a predetermined operation. The monitor apparatus monitors a state of a predetermined monitor region.

Figure 1:
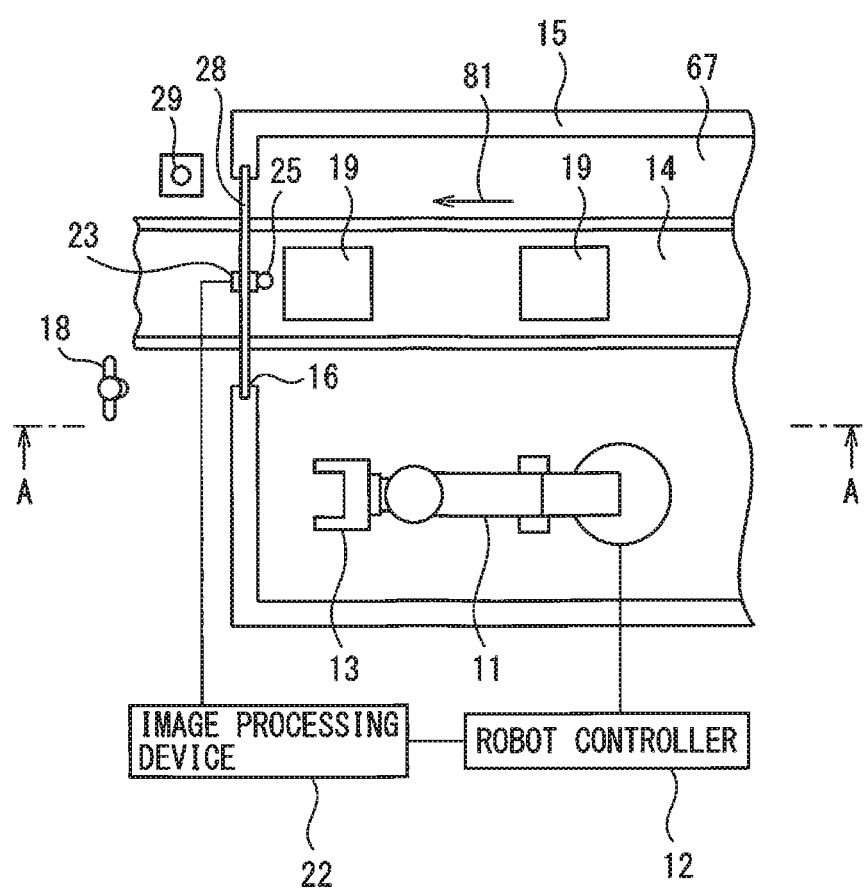
FIG. 1 is a schematic plan view showing a robot system according to an embodiment.
Figure 2:
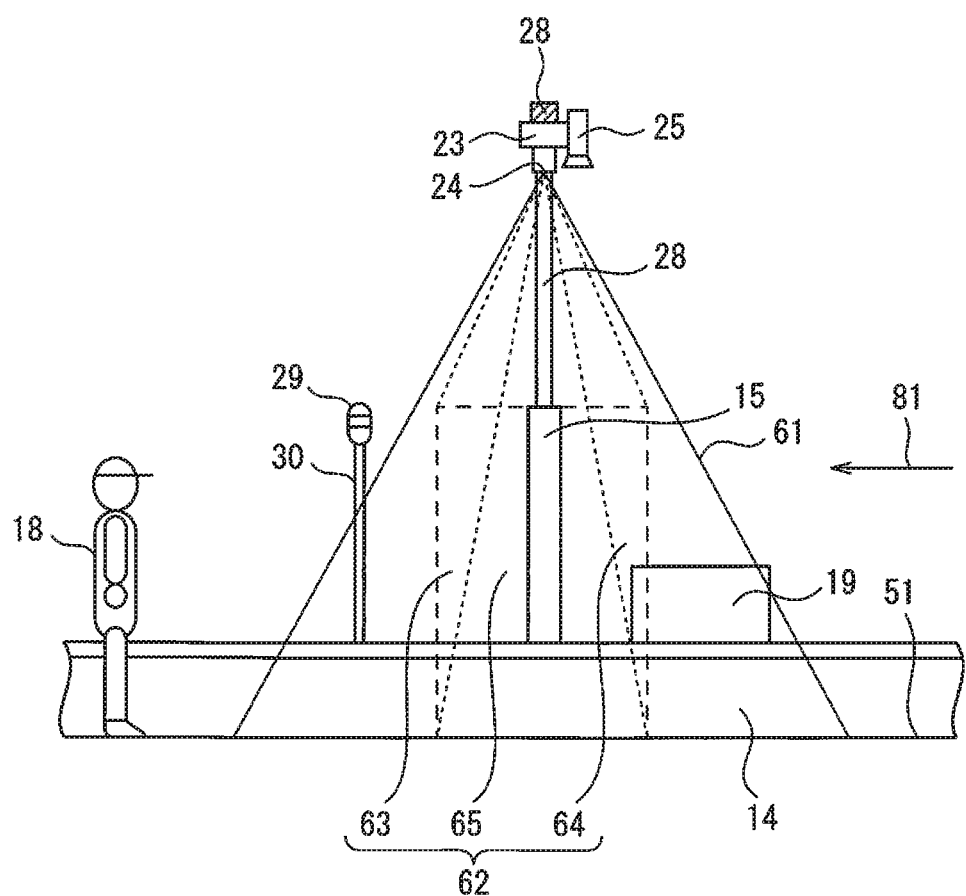
FIG. 2 is a schematic partial cross-sectional view showing the robot system according to the present embodiment.
Figure 3:
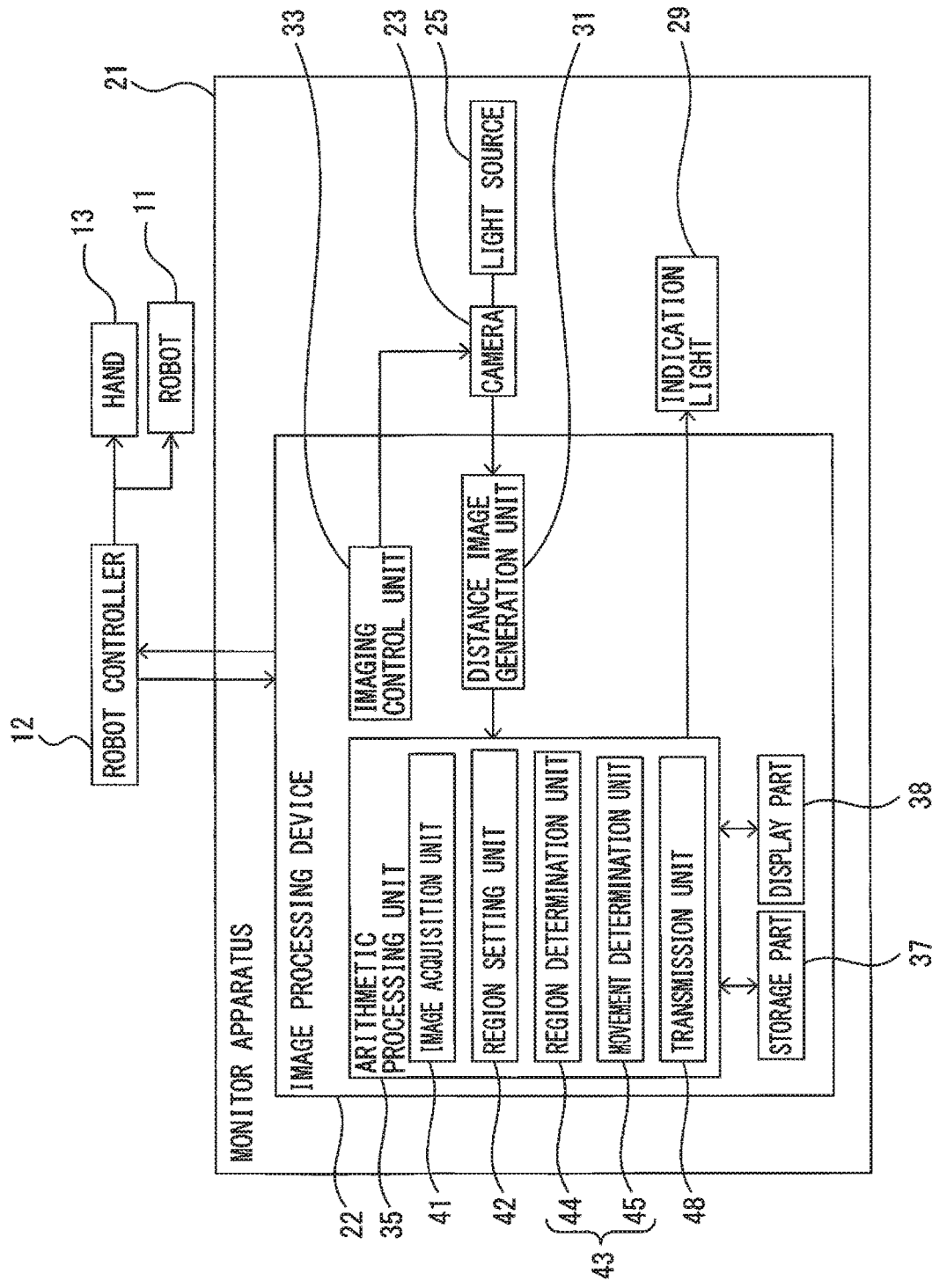
FIG. 3 is a block diagram showing the robot system according to the embodiment.

FIG. 1 is a schematic diagram showing the robot system according to the present embodiment. FIG. 2 is a partial cross-sectional view showing the robot system according to the present embodiment. FIG. 2 is a cross-sectional view taken along line A-A of FIG. 1. FIG. 3 is a block diagram showing the robot system according to the present embodiment. Referring to FIGS. 1 to 3, the robot system of the present embodiment includes a robot 11 that performs a predetermined operation and a robot controller 12 that controls the robot 11.

The robot 11 is connected to a hand 13 acting as an end effector. The robot 11 of the present embodiment attaches a part to a workpiece 19 that is transferred on a conveyor 14. The conveyor 14 transfers the workpiece 19 in the direction indicated by arrow 81. The operation of the robot is not limited to the attachment of parts. The robot can perform any operations. For example, the operation of the robot includes changing an orientation of the workpiece, welding, painting, etc. The end effector is a device that is selected for the operation performed by the robot.

The robot controller 12 is composed of, for example, an arithmetic processing device (digital computer) that includes a CPU (Central Processing Unit) that acts as a processor, and RAM (Random Access Memory), ROM (Read Only Memory), etc. that are connected to the CPU via a bus. The robot controller 12 transmits an action command to the robot 11 and the hand 13.

A workspace 67 is set in advance around the robot 11 as a working region of the robot 11. In the workspace 67, a device where the approach of an operator is restricted is arranged. The workspace 67 is set for safety and is a region in which the entry of the operator into the workspace 67 is restricted. For example, the workspace 67 is set so as to prevent the operator 18 or a transfer vehicle from coming into contact with the robot 11 during the operation of the robot 11. In the present embodiment, a fence 15 is disposed around the robot 11 so as to define the workspace 67. Furthermore, an exit part 16 is formed where the fence 15 is not provided. The conveyor 14 is disposed so as to pass through the exit part 16. The workpiece 19 is transferred from the workspace 67 through the exit part 16.

The operator 18 can enter the workspace 67 surrounded by the fence 15 from the exit part 16. However, the operator 18 preferably stays out of the workspace 67 during the period in which the robot 11 is driven.

The robot system of the present embodiment includes a monitor apparatus 21. The monitor apparatus 21 detects the entry of the operator 18 into the workspace 67 from the exit part 16 during the period in which the robot 11 is driven. Moreover, the monitor apparatus 21 detects the exit of the workpiece 19 from the workspace 67. In the present embodiment, the robot controller 12 performs control so as to stop the robot 11 and the hand 13 when the operator 18 enters the workspace 67 during the period in which the robot 11 is driven.

The monitor apparatus 21 includes an indication light 29 that acts as a notification device for notifying the movement of the object of the operator 18. The indication light 29 is formed so as to be illuminated with a predetermined color. The indication light 29 is supported by a support member 30. The indication light 29 is located so as to be viewed by the operator 18. The indication light 29 of the present embodiment is disposed near the exit part 16.

The monitor apparatus 21 of the present embodiment includes a camera 23 that captures an image of a predetermined region. The camera 23 is a three-dimensional camera that captures a three-dimensional image. The camera 23 of the present embodiment can obtain a distance image including information on the distance from the lens center point 24 of the camera 23 to the object to be imaged.

The camera 23 of the present embodiment is a camera that captures a distance image according to a time-of-flight method. Such a camera is also referred to as a TOF (Time of Flight) camera. The camera 23 includes a pixel sensor. The pixel sensor may be any pixel sensor that can capture a distance image. For example, the pixel sensor may be a CMOS (Complementary Metal Oxide Semiconductor) sensor. The monitor apparatus 21 includes a light source 25 that emits light onto a region to be imaged by the camera 23. The light source 25 emits light when the camera 23 captures the image. The camera 23 receives light that is emitted from the light source 25 and is then reflected on the surface of the object, by means of the pixel sensor.

The camera 23 is supported by a support member 28 that is fixed to the fence 15. The camera 23 is disposed so as to capture the image of the exit part 16. The camera 23 of the present embodiment is disposed so as to capture the image of the overall exit part 16 from the position that is directly above the exit part 16.

The monitor apparatus 21 includes an image processing device 22 that processes the output signal of the camera 23. The image processing device 22 can be composed of an arithmetic processing device (digital computer) including a CPU, a ROM, a RAM, etc. The image processing device 22 is formed so as to communicate with the robot controller 12.

The image processing device 22 includes an imaging control unit 33 that controls the camera 23 and the light source 25. The imaging control unit 33 transmits an imaging command to the camera 23. The imaging control unit 33 controls the light source 25 so as to emit light several times when the camera 23 captures the image.

The image processing device 22 includes a storage part 37 that stores information when the image captured by the camera 23 is processed. The storage part 37 stores, for example, a distance determination range for determining the distance image and determination results. The image processing device 22 includes a display part 38 that displays information on the images of the camera 23. The display part 38 includes a liquid crystal display panel, etc. The display part 38 can display, for example, a captured distance image. Furthermore, the display part 38 can display a warning, the determination range, etc.

The image processing device 22 includes a distance image generation unit 31 that generates the distance image from the output signal of the camera 23 according to the flight time of light. The distance image includes information on a depth to the object. For example, the distance image includes information on a distance from the lens center point 24 of the camera 23 to an imaged object. The distance information is generated for, for example, each pixel of the pixel sensor. The distance image generation unit 31 calculates the propagation time of light and then calculates the distance from the camera 23 to the object that is included in the image. The distance image generation unit 31 measures the time during which light is emitted from the light source 25 and returns to the camera 23. For example, the distance image generation unit 31 detects a phase difference of the light and calculates the time during which light is reflected on the surface of the object and returns to the camera 23. The distance image generation unit 31 can calculate the distance to the object based on the measured time and the speed of light. In this way, the distance image generation unit 31 receives a signal generated by the pixel sensor of the camera 23 and then generates a distance image. Furthermore, the distance image generation unit 31 may calculate the position of any measurement point of the object included in the image, based on the distance to the measurement point.

The image processing device 22 includes an arithmetic processing unit 35 that processes the distance image that is captured by the camera 23. The arithmetic processing unit 35 includes an image acquisition unit 41 that captures the distance image that is generated by the distance image generation unit 31.

Figure 4:
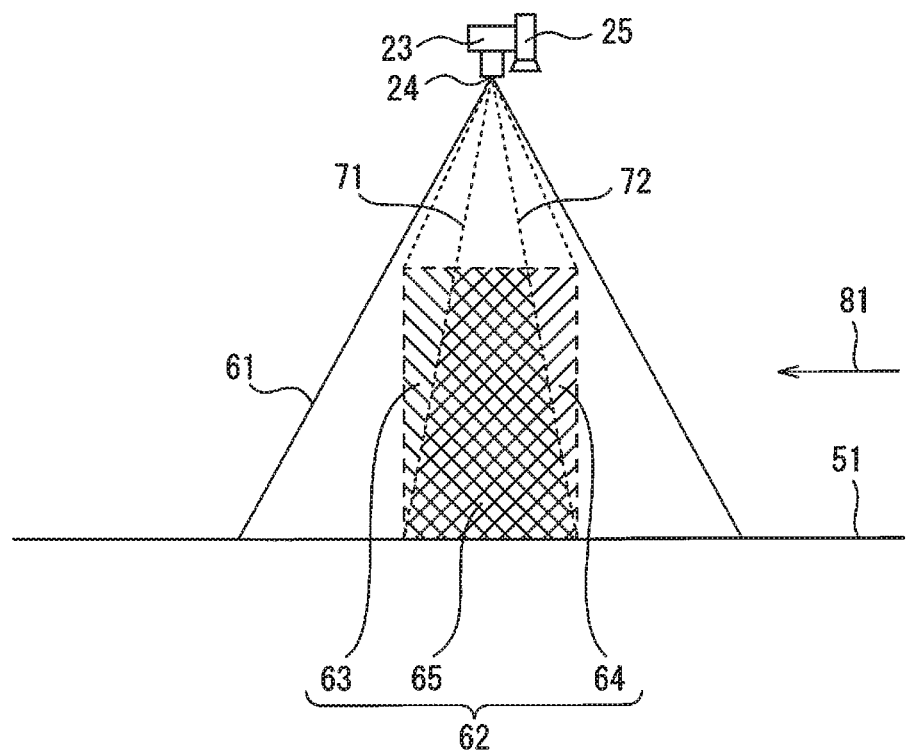
FIG. 4 is a side view for explaining a monitor region and spatial regions.
Figure 5:
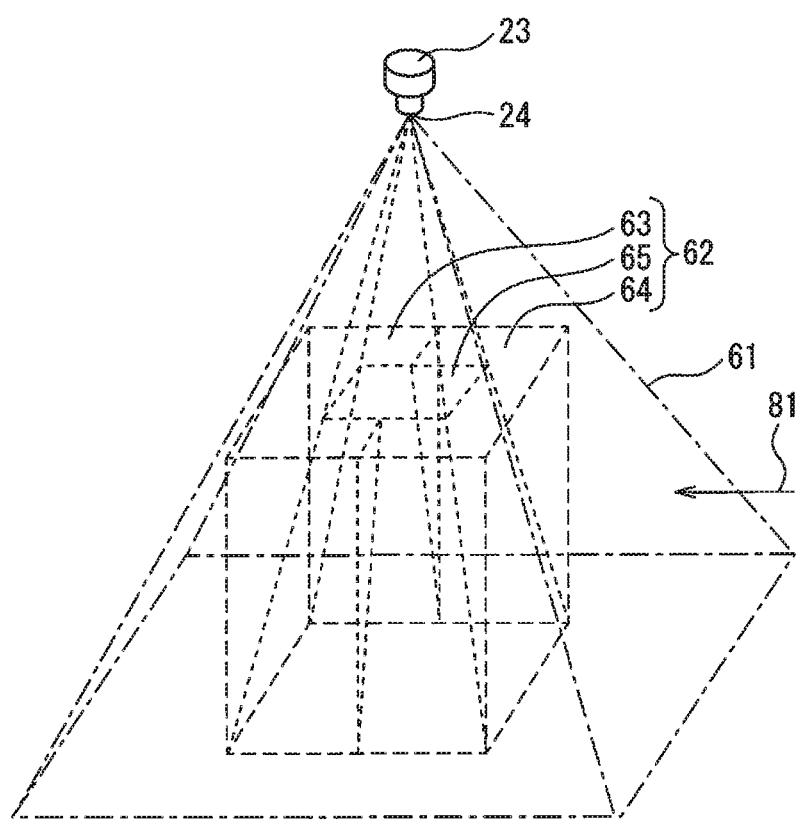
FIG. 5 is a perspective view for explaining the monitor region and the spatial regions.

FIG. 4 shows a side view for explaining a monitor region for monitoring by the monitor apparatus according to the present embodiment. The conveyor 14, the fence 15, etc. are omitted in FIG. 4. FIG. 5 shows a perspective view for explaining the region for monitoring according to the present embodiment. Referring to FIGS. 3 to 5, the camera 23 of the present embodiment is disposed so as to face a floor 51. The camera 23 is arranged such that the line of sight (optical axis) of the camera is directed downward in the vertical direction.

The camera 23 can capture the image of an image capturing region 61. The image capturing region 61 is set so as to radially extend from the lens center point 24 of the camera 23. The image capturing region 61 of the present embodiment is shaped like a quadrangular pyramid. The image capturing region 61 is not limited to the shape of a quadrangular pyramid and may have any shape. For example, a camera that has an image capturing region in a conical shape may be used.

In a part of the image capturing region 61, a monitor region 62 is set for monitoring the object. The monitor region 62 is a spatial region that has a stereoscopic shape. The monitor region 62 of the present embodiment is shaped like a rectangular solid. The shape of the monitor region 62 is not limited to a rectangular solid, and any shape can be employed. The monitor region 62 is set so as to include at least a part of the boundary between the inside and outside of the workspace 67. In the monitor region 62, the exit part 16 that is a part to be monitored is included. The monitor region 62 is formed widely so as to arrange the workpiece 19 inside the monitor region 62. The monitor region 62 of the present embodiment is as high as the fence 15. The size of the monitor region 62 is not limited to this embodiment and any size can be employed. The range of the monitor region 62 is set in advance by the operator and is stored in the storage part 37.

The arithmetic processing unit 35 includes a region setting unit 42 that sets a plurality of spatial regions by dividing the monitor region 62. The region setting unit 42 of the present embodiment divides the monitor region 62 into three spatial regions. The method of dividing the monitor region 62 by means of the region setting unit 42 is determined in advance and is stored in the storage part 37.

The region setting unit 42 of the present embodiment sets a precaution region 63 as a first spatial region, a limit region 64 as a second spatial region, and an intermediate region 65 as a third spatial region. The precaution region 63 and the limit region 64 are boundary regions that includes the boundary surfaces of the monitor region 62. Referring to FIG. 2, the precaution region 63 is disposed outside the fence 15. In other words, the precaution region 63 is disposed outside the workspace 67.

The limit region 64 is disposed in the workspace 67 that is surrounded by the fence 15. The limit region 64 is a region in which the entry of the operator is restricted. In the present embodiment, the entry of the operator is prohibited in the limit region 64 during the period in which the robot 11 is driven. The limit region 64 is disposed inside the fence 15.

The intermediate region 65 is a region between the precaution region 63 and the limit region 64. In the present embodiment, the intermediate region 65 is formed largely so as to arrange the workpiece 19 inside the intermediate region when the workpiece 19 is transferred by the conveyor 14. The intermediate region 65 is set such that the workpiece 19 is smaller than the intermediate region 65 in a distance image.

Figure 6:
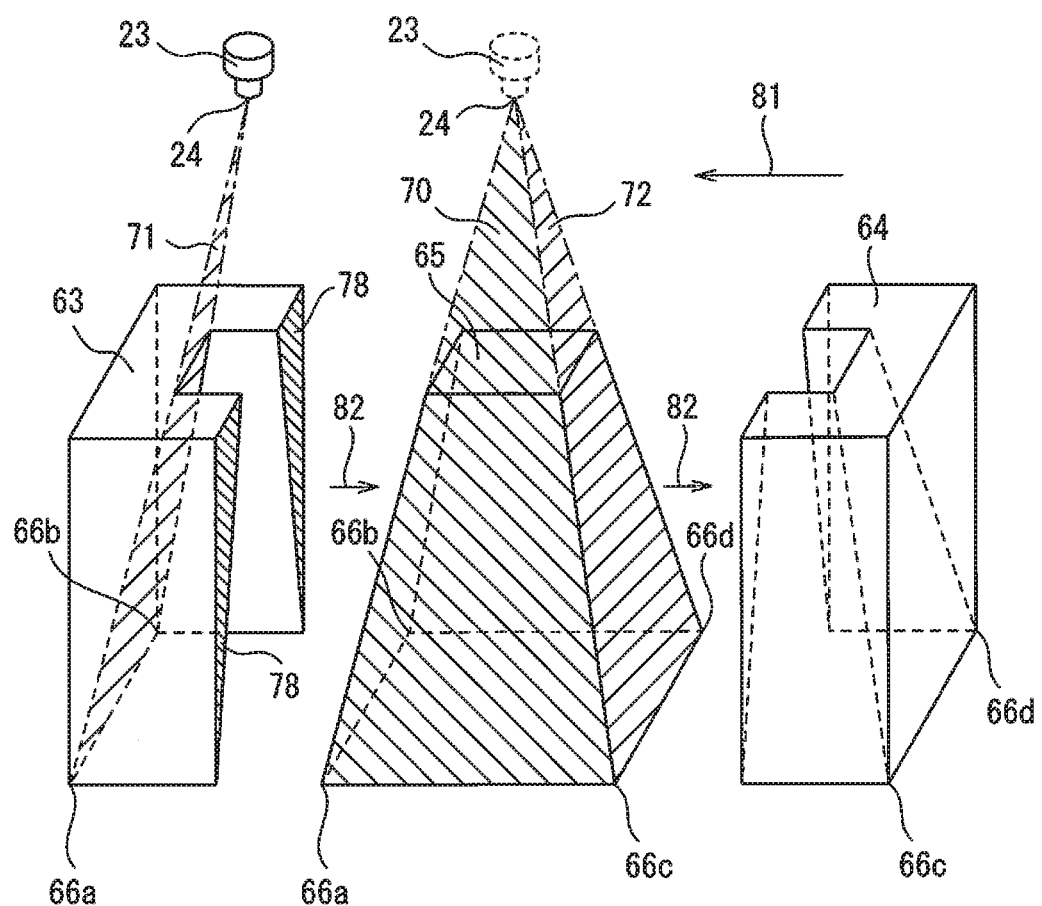
FIG. 6 is a perspective view for explaining the spatial regions that is set by dividing the monitor region.

FIG. 6 shows a perspective view for explaining the spatial regions that are separated by the region setting unit. In FIG. 6, as indicated by arrow 82, the spatial regions are separately illustrated. Referring to FIGS. 3 to 6, the region setting unit 42 divides the monitor region 62 at a plurality of cutting planes that are radially extending from the camera 23 serving as a start point. In the present embodiment, the cutting planes that radially extend from the lens center point 24 of the camera 23 serving as the start point are employed.

For example, a flat cutting plane 71 that extends from the lens center point 24 to the floor 51 is set. The cutting plane 71 is a plane passing through the lens center point 24 and vertexes 66a and 66b at the bottom surface of the monitor region 62. The boundary surface between the precaution region 63 and the intermediate region 65 is set by the cutting plane 71. Moreover, a flat cutting plane 72 that extends from the lens center point 24 to the floor 51 is set. The cutting plane 72 is a plane passing through the lens center point 24 and vertexes 66c and 66d at the bottom surface of the monitor region 62. The boundary surface between the intermediate region 65 and the limit region 64 is set by the cutting plane 72. Furthermore, a flat cutting plane 70 that extends from the lens center point 24 to the floor 51 is set. The cutting plane 70 is a plane passing through the lens center point 24 and the vertexes 66a and 66c at the bottom surface of the monitor region 62. The boundary surface between the intermediate region 65 and the precaution region 63 and the boundary surface between the intermediate region 65 and the limit region 64 are set by the cutting plane 70. The boundary surface between other spatial regions is also set by a cutting plane that are radially extending from the lens center point 24. The cutting planes 78 are the boundary surfaces between the precaution region 63 and the limit region 64. The cutting planes 78 are set on the boundary surface between the workspace 67 and a region outside the workspace 67.

The precaution region 63 as the first spatial region is a spatial region on one end in the direction of arrow 81. The limit region 64 as the second spatial region is a spatial region on the other end in the direction of arrow 81. The first spatial region and the second spatial region are provided as spatial regions on the ends of the predetermined direction. The first spatial region and the second spatial region include the boundary surfaces of the monitor region 62. In this way, the region setting unit 42 can set a plurality of the spatial regions by cutting the monitor region 62 according to a plurality of the cutting planes. The cutting planes of the present embodiment are flat planes, but the embodiment is not limited to this. The cutting plane may be formed in curved shape.

The monitor apparatus 21 of the present embodiment determines the presence or absence of the object such as the workpiece 19 and the operator 18 in the respective spatial regions. The arithmetic processing unit 35 includes a determination unit 43 that determines the states of the plurality of the spatial regions based on the distance image that is captured by the camera 23. The determination unit 43 determines a state of the monitor region 62, a state of the precaution region 63, a state of the limit region 64, and a state of the intermediate region 65 based on the distance image.

The determination unit 43 of the present embodiment includes a region determination unit 44 that determines the presence or absence of the object to be monitored in the respective spatial regions. In the state of FIG. 2, the region determination unit 44 determines that the object is present in the limit region 64.

Figure 7:
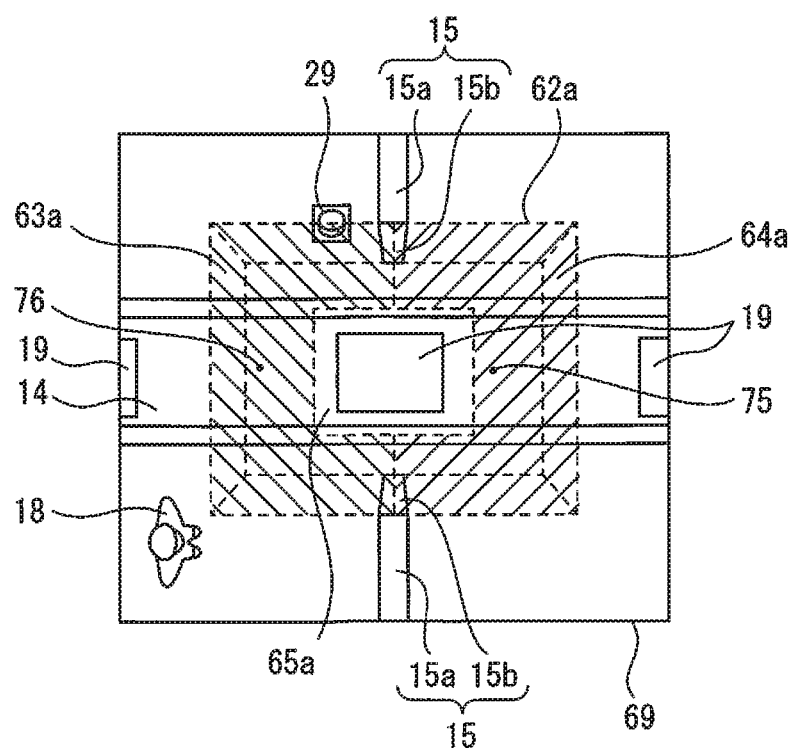
FIG. 7 shows an example of an image captured by a camera.

FIG. 7 shows an example of a distance image that is captured by the camera. In FIG. 7, the edges of the objects are indicated by lines. The image viewed from the camera 23 is the image that is obtained by one-point perspective. Thus, a top face 15a and a side 15b of the fence 15 are photographed. The image capturing region 61 corresponds to an outer edge 69 of the distance image. In the distance image, an image area 62a that corresponds to the monitor region 62 is set. An image area 63a that corresponds to the precaution region 63 is set. In addition, an image area 64a that corresponds to the limit region 64 is set. Furthermore, an image area 65a that corresponds to the intermediate region 65 is set. The monitor region 62 is formed according to the size of the exit part 16.

Figure 8:
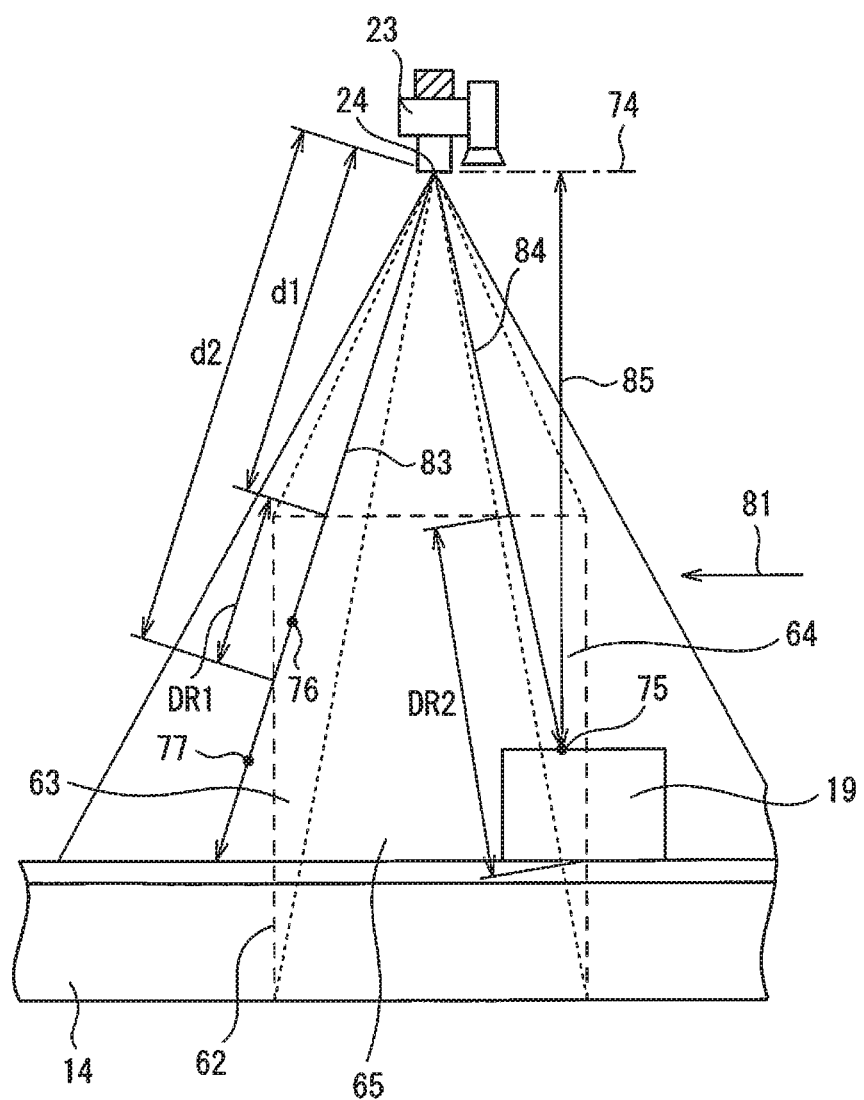
FIG. 8 is an enlarged side view showing the camera, a workpiece, and a conveyor.

FIG. 8 is an enlarged side view showing the spatial regions and the workpiece. In the example of FIG. 8, a part of the workpiece 19 is disposed in the monitor region 62. The workpiece 19 is disposed in the limit region 64 and the intermediate region 65. Referring to FIGS. 3, 7, and 8, the region determination unit 44 determines the presence or absence of the object in the respective spatial regions. In the present embodiment, a plurality of measurement points are set in the image areas 62a, 63a, 64a, and 65a that correspond to the respective spatial regions. Furthermore, for the measurement points of the object captured in the image areas 62a, 63a, 64a, and 65a, the determination ranges of the distances from the camera 23 to the measurement points of the object are determined in advance and are stored in the storage part 37. More specifically, the determination ranges of the distances are determined in advance for the pixels of the pixel sensor for the respective image areas 62a, 63a, 64a, and 65a. The spatial region that corresponds to the pixel and the determination range of the distance are set for the each pixel.

For example, the direction indicated by arrow 83 corresponds to a pixel. In this case, the measurement point 76 is included in the precaution region 63, whereas the measurement point 77 is not included in the precaution region 63. The distance from the lens center point 24 to the measurement point can be obtained from the distance image. If the distance from the lens center point 24 is included in determination range DR1, the region determination unit 44 determines that the measurement point is included in the precaution region 63. In this example, determination range DR1 is the range from distance d1 to distance d2. Since the measurement point 76 is included in the determination range DR1, it is determined that the object is present in the precaution region 63. Since the measurement point 77 is disposed outside the determination range DR1, it is determined that the object is not present in the precaution region 63.

In the detection of the workpiece 19 shown in FIG. 8, the measurement points are set on the surface of the workpiece 19. From among the measurement points, for example, a measurement point 75 is determined. For a pixel corresponding to the measurement point 75, a determination range DR2 of the limit region 64 is determined in advance. The distance indicated by arrow 84 from the lens center point 24 to the measurement point 75 is included in the determination range DR2. Thus, the region determination unit 44 determines that the object is present in the limit region 64. The presence or absence of the object in the precaution region 63 and the intermediate region 65 can be determined under the similar control. Moreover, the object to be detected is not limited to the workpiece 19. Other objects including the operator 18 and a transfer vehicle, etc. may be detected.

In this way, from the distance image, the region determination unit 44 acquires the distance to the measurement point on the surface of the object, and if the distance to the measurement point is within the predetermined determination range, it is determined that the object is present in the spatial region that corresponds to the image area. The region determination unit 44 of the present embodiment determines that the object is present in the spatial region when at least a part of the object is present in the spatial region.

The distance image includes various objects in addition to the object to be monitored. The objects to be monitored in the present embodiment are the workpiece 19 and the operator 18. For example, in the example of FIG. 8, the conveyor 14 is disposed in the respective spatial regions. When the determination range is set, the determination range can be set by avoiding objects other than the object to be monitored. For example, as indicated by the determination range DR2 of FIG. 8, the determination range can be set so as to avoid the conveyor 14.

In the setting of the determination range, the camera 23 can capture the distance image in advance in the absence of the object to be monitored. This distance image can be set as a reference image. The reference image includes information on the distance to the fence 15, the distance to the conveyor 14, and the distance to the floor 51 in addition to information on the shapes of the fence 15 and the conveyor 14. The operator can set the determination range of a distance based on the distance to the each member and the boundary surface of the spatial region to be set.

Alternatively, the region determination unit 44 may determine whether or not the object to be monitored is included in the distance image. The storage part 37 can store the distance image that does not include the object to be monitored, as a reference image. After the camera 23 captures the image, the region determination unit 44 can detect the object that is not included in the reference image by comparing this distance image and the reference image. In this detection, the region determination unit 44 can use the edge of the object or the distance to the object. Moreover, the region determination unit 44 can determine that the object that is not included in the reference image is the object that should be monitored. The region determination unit 44 can determine the presence or absence of this object in the respective spatial regions. In this case, as indicated by the determination range DR1, the determination range can be set based on the boundary surface of the spatial region while the device such as the conveyor that is arranged in advance is not taken into consideration.

Figure 9:
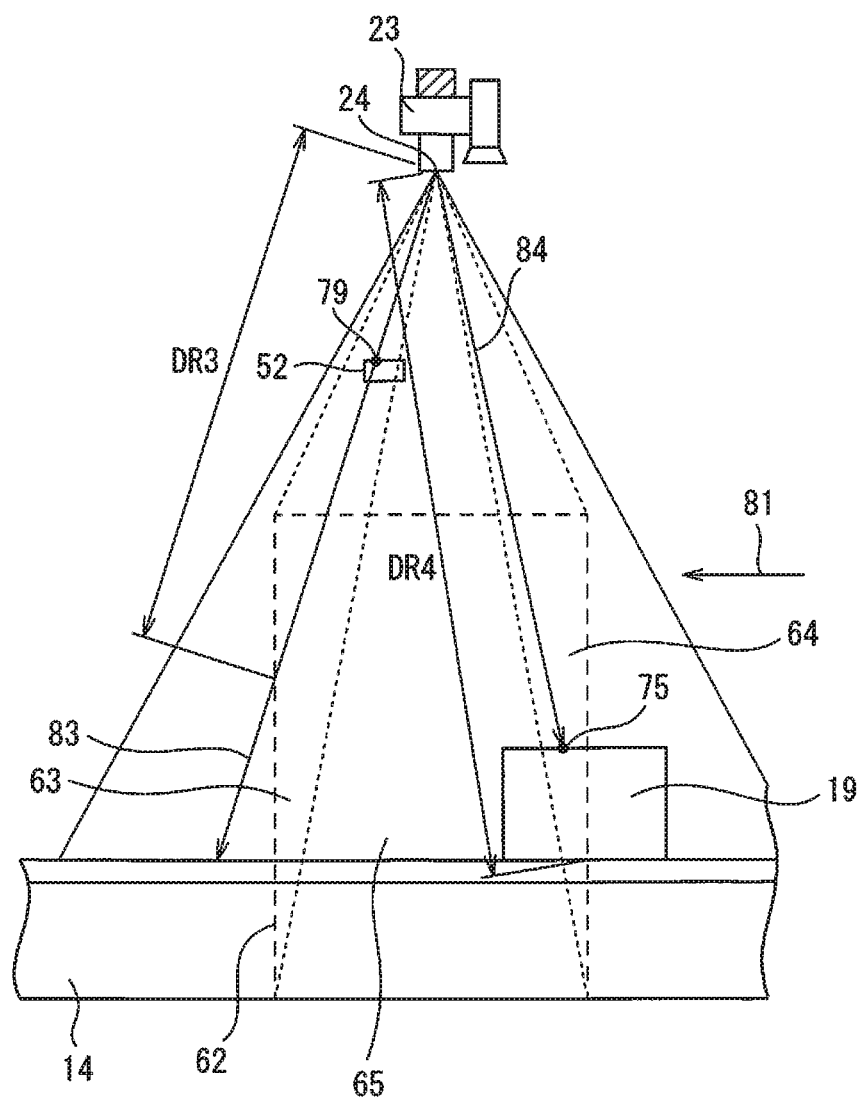
FIG. 9 is another enlarged side view showing the camera, the workpiece, and the conveyor.

FIG. 9 is an enlarged side view of the camera, the workpiece, and the conveyor for illustrating other determination ranges. In the embodiment described above, the determination ranges are set so as to be arranged in the internal space of the monitor region 62, but the embodiment is not limited to this. For example, the object 52 may pass between the camera 23 and the monitor region 62. In this case, the monitor region 62 may be blocked by the passing object 52, whereby the presence or absence of the object in the monitor region 62 may not be determined correctly.

Thus, in the example of FIG. 9, the start points of the determination ranges are set at the lens center point 24. For example, the range from the lens center point 24 to the boundary of the monitor region 62 is set as determination range DR3 with respect to the precaution region 63. The range from the lens center point 24 to the conveyor 14 is set as determination range DR4 with respect to the limit region 64.

If the distance from the lens center point 24 to the measurement point is within the determination range, the region determination unit 44 can determine that the object is present in the spatial region that corresponds to the measurement point. By adopting this control, even if a desired spatial region becomes a blind spot due to the presence of the object between the camera 23 and the monitor region 62, an evaluation can be safely performed. For example, when the object 52 passes between the camera 23 and the monitor region 62, a part of the precaution region 63 becomes a blind spot. However, the region determination unit 44 can determine that the object is present in the precaution region 63 if the distance from the lens center point 24 to measurement point 79 is within the determination range DR3. In this way, the determination range can be optionally set according to the position of the camera 23 and the method of setting the monitor region.

Referring to FIG. 8, in the present embodiment, the distance from the lens center point 24 to the measurement point of the object is employed as the distance from the three-dimensional camera to the measurement point of the object, but the embodiment is not limited to this. The distance from plane 74 passing through the lens center point 24 to the measurement point 75 may be employed as the distance from the three-dimensional camera to the measurement point of the object, as indicated by arrow 85. In this case, plane 74 extends perpendicularly to the line of sight (optical axis) of the camera 23.

In the present embodiment, the spatial regions are set by dividing the monitor region 62 at the cutting planes that radially extend from the camera 23 serving as the start point. Thus, the region determination unit 44 can determine the presence or absence of the object in the spatial region by comparing the distance to the surface of the object with the determination range. The region determination unit 44 can easily determine the presence or absence of the object in the each spatial region.

In the present embodiment, the region determination unit 44 determines the presence or absence of the object in the precaution region 63 and the limit region 64. Furthermore, the region determination unit 44 determines the presence or absence of the object in the monitor region 62. In the determination for the monitor region 62, the determination range of the distance is set with respect to the monitor region 62 and the determination can be performed. Alternatively, the determination range of the distance is set in advance with respect to the intermediate region 65 and the region determination unit 44 can determine whether or not the object is present in the intermediate region 65. If the object is present in any one of the precaution region 63, the intermediate region 65, and the limit region 64, the region determination unit 44 may determine that the object is present in the monitor region 62.

Subsequently, the determination unit 43 determines the direction of movement of the object. Referring to FIGS. 1 to 3, the determination unit 43 includes a movement determination unit 45 that determines whether or not the object moves in a normal direction based on the state of the presence of the object in the first spatial region, the state of the presence of the object in the second spatial region, and the state of the presence of the object in the third spatial region. The state of the presence of the object in the spatial region corresponds to a determination result on the presence or absence of the object in the spatial region.

As indicated by arrow 81, the movement determination unit 45 permits the transfer of the object from the inside of the workspace 67 to the outside. The movement determination unit 45 permits the movement of the object from a region inside the fence 15 to a region outside the fence 15. In other words, the movement determination unit 45 determines that movement of the object from the limit region 64 to the precaution region 63 is normal. For example, if the workpiece 19 is transferred out of the workspace 67, the movement determination unit 45 determines that the movement of the object is normal.

If the object enters the workspace 67 inside the fence 15 from the outside of the fence 15, the movement determination unit 45 determines that the movement of the object is abnormal. The movement determination unit 45 determines that the movement of the object from the precaution region 63 to the limit region 64 is abnormal. For example, if the operator 18 enters inside of the fence 15 from the exit part 16, the movement determination unit 45 determines that the movement is abnormal.

The arithmetic processing unit 35 includes a transmission unit 48 that transmits information to other devices. The movement determination unit 45 determines that the movement of the object from the precaution region 63 to the limit region 64 is detected as an abnormality. The transmission unit 48 then transmits a command for stopping the device where the approach of the operator is restricted. In the present embodiment, the transmission unit 48 transmits a command for stopping the robot 11 and the hand 13 to the robot controller 12. The robot controller 12 then stops the robot 11 and the hand 13.

Figure 10:
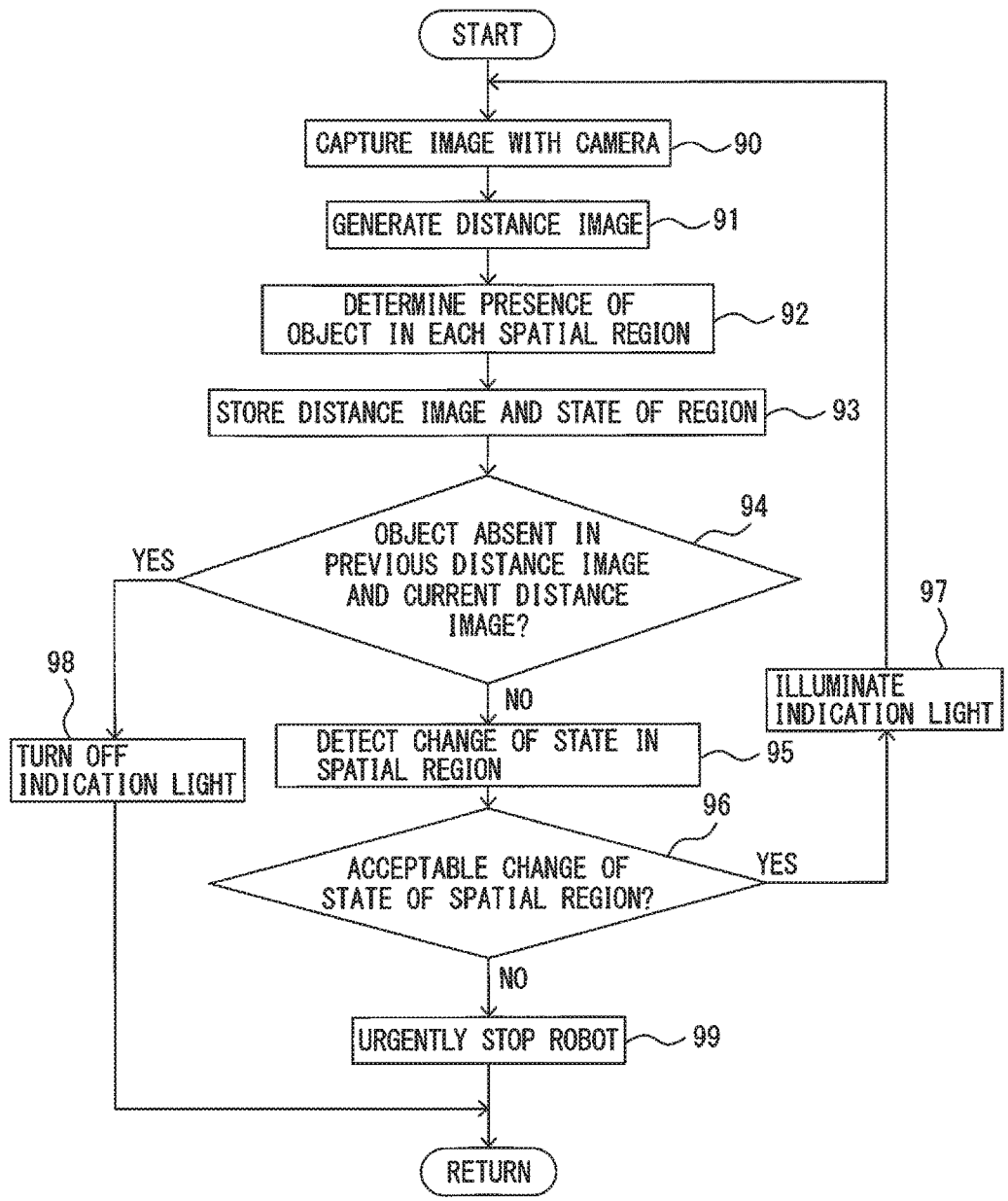
FIG. 10 is a flowchart showing control for detecting an abnormal direction of movement of an object.

FIG. 10 shows a flowchart for explaining the control of the robot system according to the present embodiment. The control of FIG. 10 can be repeatedly performed at predetermined time intervals. Referring to FIG. 10 and FIG. 3, in step 90, the camera 23 captures the image of the monitor region 62. In step 91, the distance image generation unit 31 generates the distance image. In step 92, the region determination unit 44 determines the presence or absence of the object in the respective spatial regions. In this case, the region determination unit 44 determines the presence or absence of the object in the respective spatial regions of the monitor region 62, the precaution region 63, and the limit region 64. In step 93, the current distance image is stored in the storage part 37. Moreover, the presence or absence of the object in the respective spatial regions is stored in the storage part 37.

Subsequently, in step 94, the movement determination unit 45 determines the presence or absence of the object in at least one spatial region in the previously captured distance image and the currently captured distance image. In other words, the movement determination unit 45 determines the presence or absence of the object in at least one spatial region of the monitor region 62, the precaution region 63, and the limit region 64. In the first control, the reference image can be used as the previous distance image. If the captured image is identical to the reference image, the movement determination unit 45 can determine that the object is not present in any of the spatial regions.

In step 94, if the object is not present in any of the spatial regions, the control advances to step 98. In this case, it can be determined that the workpiece 19 is not transferred or that the operator 18 does not enter the spatial regions. In step 98, the indication light 29 is turned off. If the indication light 29 has been already turned off, the indication light 29 remains off. Subsequently, the control is terminated. In step 94, if the object is present in at least one spatial region in the previous distance image and the current distance image, the control advances to step 95.

In step 95, the movement determination unit 45 detects a change in the state of the respective spatial regions. The movement determination unit 45 acquires the state of the presence of the object in the current image and the state of the presence of the object in the previous image. For example, in a predetermined spatial region, the movement determination unit 45 detects whether the state has changed from the absence of the object to the presence of the object, whether the state has changed from the presence of the object to the absence of the object, or the state of the presence of the object remains constant. Thereafter, in step 96, the movement determination unit 45 determines whether or not the change in the state of the spatial region is permitted, thereby it is determined whether or not the object moves in a normal direction.

Figure 11:
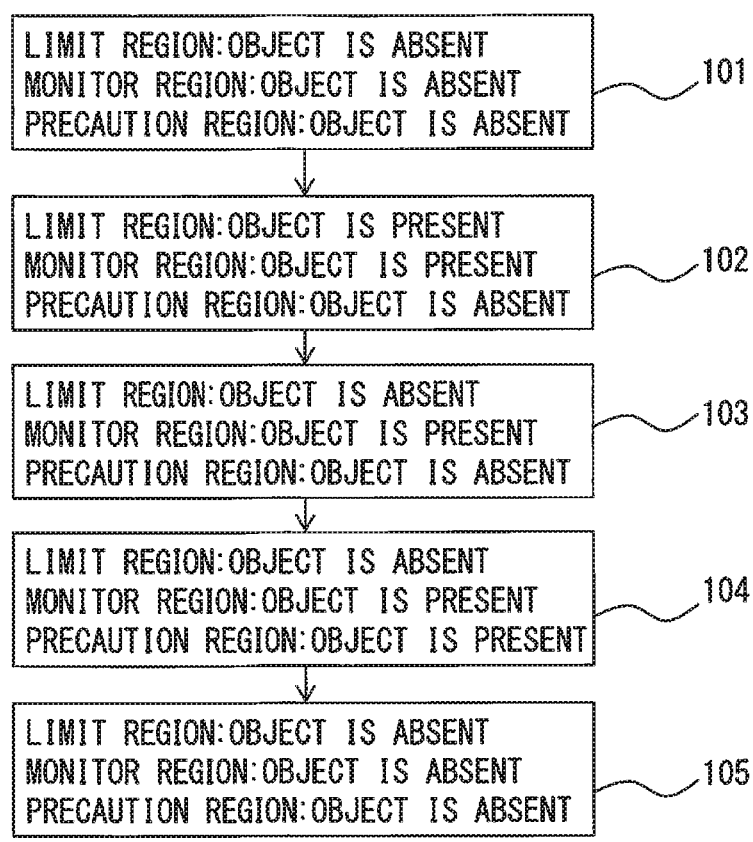
FIG. 11 is an explanatory drawing showing an acceptable change of a state in the spatial regions according to the embodiment.

FIG. 11 is an explanatory drawing showing an acceptable changes of the states of the spatial regions. FIG. 11 shows the changes of the states of the respective spatial regions when the workpiece 19 is transferred from the workspace 67. In state 101, the object is not detected in the limit region 64, the monitor region 62, and the precaution region 63. In a subsequent state 102, the workpiece 19 is moved and is at least a part of the workpiece 19 is placed in the limit region 64. In state 102, for example, the workpiece 19 in FIG. 8 is partially disposed in the intermediate region 65 and the limit region 64. In this state, it is determined that the object is present in the limit region 64 and the monitor region 62.

When the workpiece 19 is further moved, the object is present in the intermediate region 65 in state 103. In state 103, it is determined that no objects are present in the limit region 64 and the precaution region 63. In the state 103, as shown in FIG. 7, the workpiece 19 is disposed in, for example, the intermediate region 65.

The workpiece 19 is further moved in state 104. In state 104, the object is present in the monitor region 62 and the precaution region 63, but no objects are present in the limit region 64. The workpiece 19 is then further moved, resulting in the absence of the object in all the three spatial regions, as indicated in state 105.

When the change from the previous state of the spatial regions to the current state of the spatial regions is equivalent to the change of the two consecutive states that is included in FIG. 11, the movement determination unit 45 determines that the object moves from the workspace 67 to the outside. The movement determination unit 45 determines that the movement direction of the object is normal. Furthermore, in the absence of the change from the previous state of the spatial regions to the current state of the spatial regions, the movement determination unit 45 determines that the movement direction of the object is normal. For example, if the state of the previous distance image is state 101 and the state of the current distance image is also state 101, the movement determination unit 45 determines that the movement direction of the object is normal. The pattern of the normal change of the state in FIG. 11 is stored in advance in the storage part 37.

Figure 12:
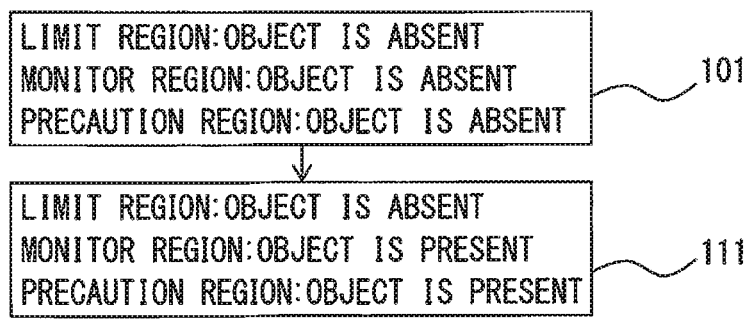
FIG. 12 is a first diagram for explaining an unacceptable change of the state in the spatial regions according to the embodiment.

FIG. 12 shows a first example of an abnormal change of the state in the spatial regions. In state 101, no objects are present in the three spatial regions. In the subsequent state 111, the object is present in the monitor region 62 and the precaution region 63, but no objects are present in the limit region 64. In the change from state 101 to state 111, it can be determined that the object enters the workspace 67 from the outside. In other words, although state 101 should be followed by state 102 as shown in FIG. 11, state 101 is followed by state 111. Thus, the movement determination unit 45 determines that the change of state in the spatial regions is abnormal. Moreover, the movement determination unit 45 determines that the movement direction of the object is abnormal.

Figure 13:
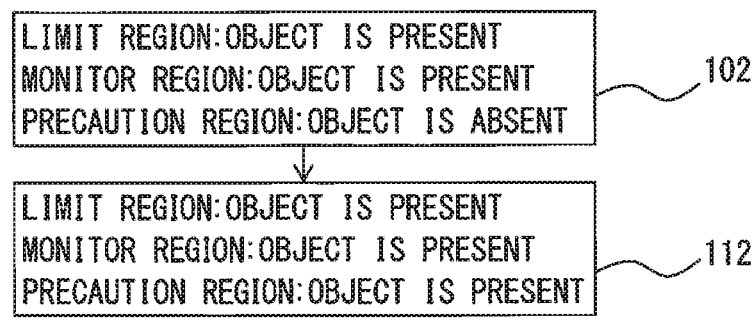
FIG. 13 is a second diagram for explaining an unacceptable change of the state in the spatial regions according to the embodiment.

FIG. 13 shows a second example of an abnormal change of state in the spatial regions. In state 102, the object is present in the limit region 64 and the monitor region 62. In the subsequent state 112, the object is present in all the three spatial regions. Although the state 102 should be followed by state 103 as shown in FIG. 11, state 102 is followed by state 112. The change of state is equivalent to, for example, the entry of the operator 18 into the workspace 67 during the transfer of the workpiece 19. Thus, the movement determination unit 45 determines that the change of state in the spatial regions is abnormal. Moreover, the movement determination unit 45 determines that the object moves in an abnormal direction.

In this way, according to the change of state in the spatial regions, the movement determination unit 45 can determine whether or not the movement direction of the object normal. The movement determination unit 45 of the present embodiment determines that any change of state other than a normal change of state is abnormal.

Referring to FIG. 10, if the change of state in the spatial regions is normal in step 96, the process advances to step 97. In step 97, the arithmetic processing unit 35 illuminates the indication light. If the indication light 29 has been already illuminated, the illuminated state is maintained. At this point, the indication light 29 is illuminated so as to indicate the transfer of the workpiece 19 from the workspace 67. The operator 18 can be notified of the transfer of the workpiece 19 by the illumination of the indication light 29.

Thereafter, the control returns to step 90 and a distance image is captured by the camera 23. Subsequently, from step 91 to step 96, the control for deciding whether the object moves in a normal direction is repeated.

In step 96, if the change of state in the spatial regions is not accepted, the control advances to step 99. For example, if the operator enters the workspace 67, the control advances to step 99. In the present embodiment, the change of state other than the change of state that is shown in FIG. 11 occurs, the control advances to step 99.

In step 99, the transmission unit 48 transmits a signal to the robot controller 12 so as to urgently stop the robot 11 and the hand 13. The robot controller 12 stops the robot 11 and the hand 13. This ensures the safety of the operator 18.

The monitor apparatus 21 of the present embodiment can detect the entry of the operator 18 into the workspace 67 from the region outside the fence 15 through the exit part 16. In particular, the monitor apparatus 21 can detect the entry of the operator 18 into the workspace 67 in a period during which the workpiece 19 is transferred through the exit part 16.

In the monitor apparatus 21 of the present embodiment, the monitor region can be set to any size at any position. Moreover, the camera 23 can be disposed so as to capture the image of the overall monitor region 62. Thus, the layout of device relative to the monitor region 62 can be set easily. Furthermore, the first spatial region and the second spatial region are set so as to include boundary surfaces on both sides of the monitor region in the predetermined direction when the monitor region 62 is divided. This facilitates the setting of the region that should be monitored. Moreover, the operator need not control the devices included in the monitor apparatus 21 in a complicated manner.

For example, if a light curtain is disposed, the positions and control of the light curtain and a photoelectric sensor need to be examined so as to prevent the operator from evading monitoring when a muting function is enabled. At this point, the operator or the like can evade monitoring in multiple patterns, and thus such patterns need to be taken into consideration. To address this problem, the monitor apparatus 21 of the present embodiment can monitor the object such as the operator, with a simple layout of devices and simple control so as to prevent the object from evading monitoring.

The monitor apparatus 21 of the present embodiment can detect, in particular, a normal movement of the object and an abnormal movement of the object. In the presence of the object transferred to the outside in one direction, the entry of the object in the other direction can be detected. In other words, the object that moves in the direction opposite to the normal direction can be detected.

The monitor apparatus 21 of the present embodiment can be formed by the single three-dimensional camera and the image processing device, and thus has a simple configuration. For example, if the monitor apparatus includes a light curtain, a photoelectric sensor is necessary for performing the muting function. In the monitor apparatus of the present embodiment, the presence of the object and the abnormal movement of the object can be detected by the single three-dimensional camera.

The indication light 29 of the present embodiment is formed so as to activate in response to the detection of the movement of the object from the limit region 64 to the precaution region 63. In the present embodiment, the indication light 29 is activated in order to notify the operator 18 of the transfer of the workpiece 19, but the embodiment is not limited to this. The indication light may be activated when the movement determination unit 45 detects the movement of the object from the precaution region 63 to the limit region 64. In other words, the arithmetic processing unit 35 may perform the control for illuminating the indication light when the object moves in the direction opposite to a permissible direction. By adopting this control, a warning can be issued to the operator 18 that enters the workspace 67. Alternatively, the operator 18 can be notified of the entry of the object into the workspace 67.

Alternatively, the indication light 29 may be activated when the object moves from the limit region 64 to the precaution region 63 and when the object moves from the precaution region 63 to the limit region 64. In this case, the lighting pattern is preferably changed according to the direction of movement of the object.

The notification device that notifies the movement of the object to the operator is not limited to the indication light. A buzzer that issues a warning sound may instead be used. If the monitor apparatus includes the buzzer, the warning sound for the transfer of the object and the warning sound for the entry of the object into the workspace 67 can be changed. Alternatively, the notification device may include both the indication light and the buzzer.

The region setting unit 42 of the present embodiment divides the monitor region 62 into three spatial regions, but is not limited thereto. The monitor region may be divided into two spatial regions.

Figure 14:
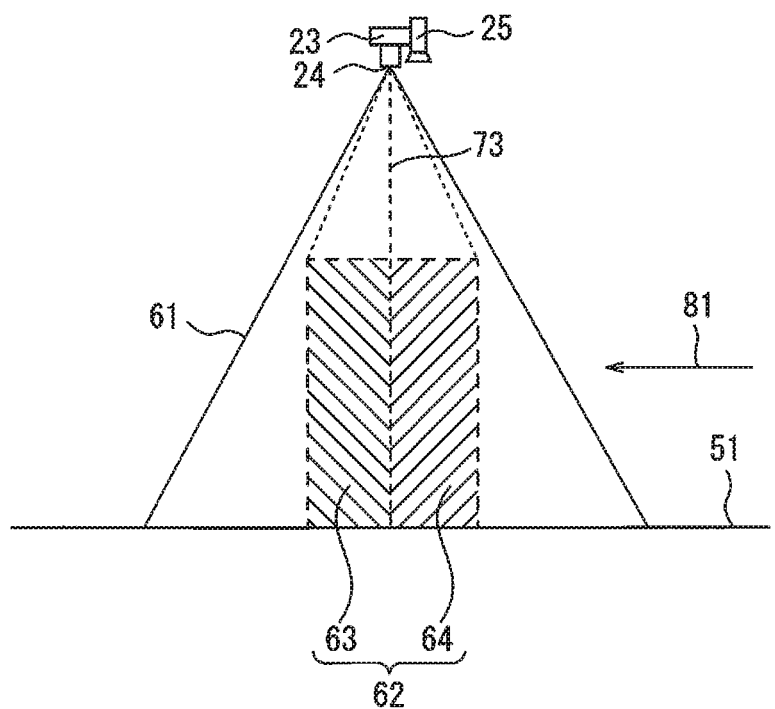
FIG. 14 is a side view for explaining another method of dividing the monitor region.

FIG. 14 is a side view of the monitor region that is divided into two spatial regions. The region setting unit 42 divides the monitor region 62 into the precaution region 63 and the limit region 64 along the cutting plane 73. Also in this method of dividing the monitor region 62, the direction of the movement of the object can be detected under the same control. When the determination unit 43 detects the movement of the object from the precaution region 63 to the limit region 64, the robot can be controlled so as to stop.

Furthermore, the region setting unit 42 may divide the monitor region 62 into at least four spatial regions. For example, referring to FIG. 4, another spatial region may be set inside the precaution region 63. As the number of spatial regions in the monitor region increases, a movement of the object can be more minutely determined.

The camera of the present embodiment captures the distance image based on the flight time of light, but is not limited thereto. The three-dimensional camera may be any camera that can acquire the distance from the camera to the object. The three-dimensional camera may be, for example, a stereo camera that includes two cameras arranged at predetermined relative positions. In this case, the start point of the cutting plane for dividing a monitor region can be set at the lens center point of one of the cameras as a reference.

The monitor apparatus of the present embodiment is disposed in the robot system, but is not limited thereto. The monitor apparatus can be disposed in any system. For example, the monitor apparatus of the present embodiment can be applied to a system that includes a sheet-metal pressing machine. Moreover, the monitor apparatus of the present embodiment can be disposed in any system that determines the presence or absence of the object in the predetermined region or any system that determines whether or not the object enters the predetermined region.

According to an aspect of the present disclosure, the monitor apparatus in which the arrangement of the devices is set easily and the control is performed easily can be provided.

In the above-mentioned control, the order of steps can be optionally changed as long as the functions and effects remain the same.

The embodiment can be combined as deemed appropriate. In the drawings, the same or equivalent parts are indicated by the same symbols. The embodiment is merely exemplary and does not limit the invention. Moreover, the embodiment includes the modifications that is indicated in the claims.

The invention claimed is:

1. A monitor apparatus, comprising:
   a three-dimensional camera configured to capture a three-dimensional image in a first direction; and
   a processor configured to
   process an output signal of the three-dimensional camera,
   set a part of an image capturing region of the three-dimensional camera as a monitor region for a monitoring operation,
   divide the monitor region by a plurality of cutting planes radially extending from the three-dimensional camera serving as a start point, to set a plurality of spatial regions,
   set one spatial region of the plurality of spatial regions on one end of the monitor region in a second direction as a first spatial region, the second direction being perpendicular to the first direction, and
   set another spatial region of the plurality of spatial regions on the other end of the monitor region in the second direction as a second spatial region.

2. The monitor apparatus according to claim 1, wherein the three-dimensional camera is a camera configured to acquire information on a distance to an object based on a flight time of light.

3. The monitor apparatus according to claim 1, wherein the processor is configured to
generate a distance image including distance information from the output signal of the three-dimensional camera, and
determine a state of the first and second spatial regions based on the distance image.

4. The monitor apparatus according to claim 3, wherein the processor is configured to determine presence or absence of an object to be monitored in the respective first and second spatial regions,
the distance image includes image areas corresponding to the respective first and second spatial regions,
a determination range for a distance from the three-dimensional camera to a measurement point is predetermined in advance, the measurement point of the object being imaged in the image area, and
the processor is configured to
acquire the distance to the measurement point from the distance image, and
determine the presence of the object in the first or second spatial region corresponding to the image area in response to the distance to the measurement point being within the predetermined determination range.

5. The monitor apparatus according to claim 3, wherein the processor is configured to
set a spatial region of the plurality of spatial regions between the first spatial region and the second spatial region as a third spatial region, and
determine whether or not a movement direction of an object is normal based on a state of presence of the object in the first spatial region, a state of the presence of the object in the second spatial region, and a state of the presence of the object in the third spatial region.

6. The monitor apparatus according to claim 5, wherein the processor is configured to
transmit information,
set
a workspace in which a device where an approach of an operator is restricted is arranged and an entry of the operator is restricted,
the first spatial region as a precaution region disposed outside the workspace, and
the second spatial region as a limit region disposed in the workspace, and
in response to detecting a movement of the object from the precaution region to the limit region, transmit a command for stopping the device where the approach of the operator is restricted.

7. The monitor apparatus according to claim 5, further comprising a notification device including at least one of a light source or a sound source, for notifying a movement of the object to an operator, wherein
the processor is configured to set
a workspace where an entry of the operator is restricted,
the first spatial region as a precaution region disposed outside the workspace, and
the second spatial region as a limit region disposed in the workspace, and
the notification device is configured to be activated in response to the processor detecting
a movement of the object from the precaution region to the limit region, or
a movement of the object from the limit region to the precaution region.

8. The monitor apparatus according to claim 1, wherein the three-dimensional camera is configured to capture the three-dimensional image of a conveyor, and the second direction is a longitudinal direction of the conveyor.

* * * * *